(12) United States Patent
Xu et al.

(10) Patent No.: US 10,859,794 B2
(45) Date of Patent: Dec. 8, 2020

(54) AUTOMATIC FOCUSING DEVICE AND SYSTEM

(71) Applicant: HANGZHOU SHUNLI OPTOTECH CO., LTD., Hangzhou (CN)

(72) Inventors: Jiajun Xu, Hangzhou (CN); Pinqi Lou, Hangzhou (CN); Ye Gong, Hangzhou (CN)

(73) Assignee: HANGZHOU SHUNLI OPTOTECH CO., LTD., Hangzhou (CN)

( * ) Notice: Subject to any disclaimer, the term of this patent is extended or adjusted under 35 U.S.C. 154(b) by 27 days.

(21) Appl. No.: 15/971,745

(22) Filed: May 4, 2018

(65) Prior Publication Data

US 2018/0321465 A1 Nov. 8, 2018

Related U.S. Application Data

(63) Continuation of application No. PCT/CN2016/090027, filed on Jul. 14, 2016.

(30) Foreign Application Priority Data

Nov. 5, 2015 (CN) .......................... 2015 1 0740355
Nov. 5, 2015 (CN) ..................... 2015 2 0873093 U

(51) Int. Cl.
*H04N 5/232* (2006.01)
*G02B 7/36* (2006.01)
(Continued)

(52) U.S. Cl.
CPC ................. *G02B 7/36* (2013.01); *G02B 7/38* (2013.01); *G03B 13/36* (2013.01); *H04N 5/232* (2013.01);
(Continued)

(58) Field of Classification Search
CPC ...... G02B 7/36; G02B 7/38; H04N 5/232123; H04N 5/232127; H04N 5/232; H04N 2201/0084; G03B 13/36
See application file for complete search history.

(56) References Cited

U.S. PATENT DOCUMENTS 4,924,317 A * 5/1990 Hirao ................. H04N 5/23212
348/351
5,442,167 A * 8/1995 Cornelius ................ G02B 7/36
250/201.2
(Continued)

FOREIGN PATENT DOCUMENTS

| CN | 1618231 A | 5/2005 |
| CN | 1862358 A | 11/2006 |

(Continued)

OTHER PUBLICATIONS

International Search Report issued in corresponding International Application No. PCT/CN2016/090027 dated Oct. 20, 2016 (2 pages).

(Continued)

*Primary Examiner* — Hung H Lam
(74) *Attorney, Agent, or Firm* — Osha Liang LLP

(57) ABSTRACT

The present disclosure provides an automatic focusing device, an automatic focusing electronic eyepiece and an electronic device. The automatic focusing device comprises a sensor drive unit, a master control unit and an interface unit. The master control unit is configured to control the sensor drive unit to enable the automatic focusing device to automatically focus by adjusting an image distance, the interface unit is configured to output image data of the measured target for display.

20 Claims, 6 Drawing Sheets

(51) Int. Cl.
*G03B 13/36* (2006.01)
*G02B 7/38* (2006.01)

(52) U.S. Cl.
CPC ... *H04N 5/23212* (2013.01); *H04N 5/232123* (2018.08); *H04N 5/232127* (2018.08); *H04N 2201/0084* (2013.01)

(56) References Cited

U.S. PATENT DOCUMENTS

| | | | |
|---|---|---|---|
| 5,838,374 A | 11/1998 | Kikuchi | |
| 2005/0169622 A1* | 8/2005 | Uemura | G02B 7/102 396/72 |
| 2006/0264709 A1* | 11/2006 | Fujimori | A61B 1/00029 600/130 |
| 2015/0042788 A1* | 2/2015 | Fujiwara | H04N 5/2256 348/131 |

FOREIGN PATENT DOCUMENTS

| | | |
|---|---|---|
| CN | 101191977 A | 6/2008 |
| CN | 201233491 Y | 5/2009 |
| CN | 101706609 A | 5/2010 |
| CN | 105530429 A | 4/2016 |

OTHER PUBLICATIONS

Office Action issued in corresponding Chinese Application No. 201510740355.9 dated Jan. 2, 2018, and English translation thereof (16 pages).

Written Opinon issued in corresponding International Application No. PCT/CN2016/090027 dated Oct. 21, 2016 (8 pages).

* cited by examiner

AUTOMATIC FOCUSING DEVICE AND SYSTEM

CROSS-REFERENCE TO RELATED APPLICATIONS

This application is a continuation of International Application No. PCT/CN2016/090027, which claims priorities to and benefits of Chinese Patent Application No. 201510740355.9 and 201520873093.9, filed with the State Intellectual Property Office of P. R. China on Nov. 5, 2015, the entire contents of which are incorporated herein by reference.

FIELD

The present disclosure relates to the technical field of an automatic focusing electronic microscope, an automatic focusing electronic telescope and an automatic focusing industrial camera, and more particularly, to an automatic focusing device.

BACKGROUND

An imaging device of a camera (whether a CMOS camera or a CCD camera) in the related art is fixed on a base and is connected with a front lens through a C interface or a CS interface, and the imaging devices cannot be moved. The function of the camera is to convert an optical signal into an electrical signal through photoelectric conversion to output to a terminal. There are various ways for the camera to output images, such as VGA (video graphics array), HDMI (high definition multimedia interface), YPBPR, etc., and it can also be output to a PC terminal through a USB interface for display, and various image processing can be performed through the PC terminal. Its advantage is that the camera can be docked with the lens (including a common fixed-focus lens, a microscope, a telescope, etc.) through a standard interface (the C interface or the CS interface). Its disadvantage is that the autofocus function cannot be realized since the imaging device is fixed. For example a fixed focus lens is connected.

When the focus function needs to be achieved, the front-end optical system needs to have the autofocus function, such as non-fixed-focus lens, ZOOM lens, AF (auto focus) lens, the microscope and the telescope with the autofocus function, etc. Obviously, costs of the lens, the microscope and the telescope with the auto focus function are high.

SUMMARY

The present disclosure provides an automatic focusing device. The automatic focusing device includes a sensor drive unit, a master control unit and an interface unit.

When a measured target remains at a relatively fixed position with respect to a front-end optical system, the master control unit is configured to control the sensor drive unit to enable the automatic focusing device to automatically focus by adjusting an image distance, and the interface unit is configured to output image data of the measured target for display.

The present disclosure further provides an automatic focusing electronic eyepiece. The automatic focusing electronic eyepiece includes the above-mentioned automatic focusing device.

The present disclosure further provides an electronic device. The electronic device includes the above-mentioned automatic focusing electronic eyepiece.

DETAILED DESCRIPTION

The present disclosure aims to make ordinary optical systems uncommon under the premise that the front-end optical system does not have the autofocus function (such as fixed lens, ordinary biological microscope without the focus function, stereo microscope, zoom microscope, telescope, etc.), such that the optical system that does not have the autofocus function has the autofocus function. This is achieved by changing an image distance by moving the imaging device without changing the front-end optical system.

The present disclosure does not need to change the structure of the front-end optical system, and as well as cameras in the related art, achieves connection with the front-end optical system through the standard C interface. There are various kinds of back-end output interfaces, such as HDMI, VGA, USB, etc., and there are also various kinds of control modes. Through a back-end intelligent analysis system, applications in a wide range of fields such as surface inspection, workpiece measurement and microscopic observation can be realized. It is easy to operate, efficiency is greatly improved (for example, time for microscope to focus is saved), and accuracy of focusing is improved (manual focusing is determined by human eyes, and automatic focusing is through the machine to determine a clear point).

Embodiments of the present disclosure will be described below in detail with reference to the accompanying drawings.

Embodiment One

Figure 1:
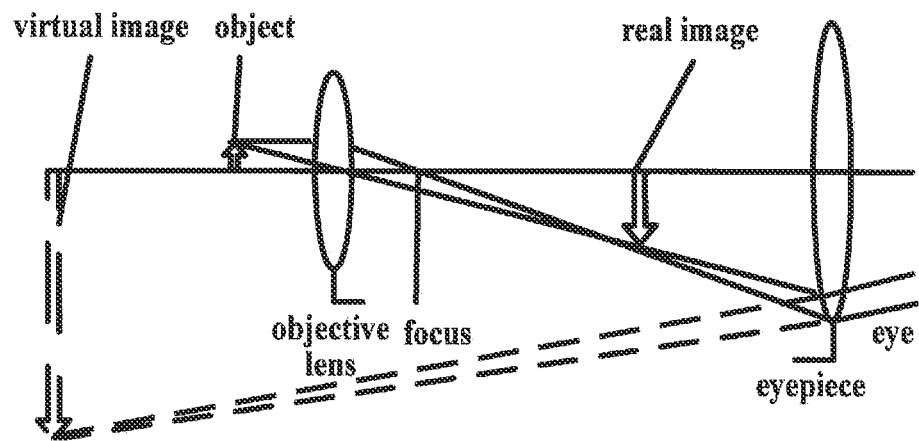
FIG. 1 is a schematic diagram illustrating a working principle of a microscope and a telescope in the related art.
Figure 2:
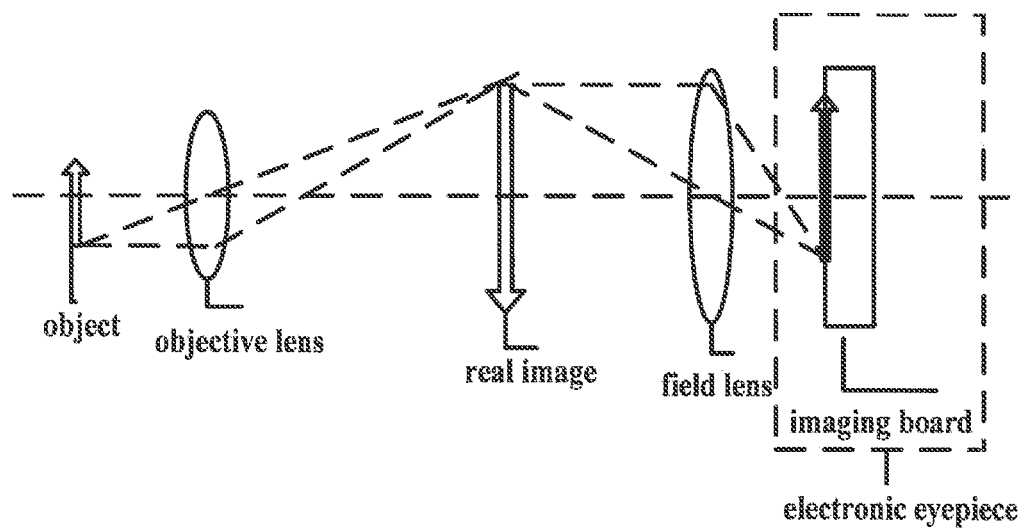
FIG. 2 is a schematic diagram illustrating a working principle of an electronic microscope and an electronic telescope in the related art.

As illustrated in FIG. 1, a microscope device or a telescope device in the related art is to form a clear virtual image at a visibility distance by enlarging a real image formed by an objective lens again. This device can only be used for observation, and cannot be used for analysis and preservation of images, the electronic microscope and the electronic telescope can make up for this defect. FIG. 2 illustrates the working principle of the electronic microscope and the electronic telescope. Although the electronic microscope and the electronic telescope in the related art can convert the optical signal into the digital signal, the analysis and preservation of images are achieved, but the autofocus function is lacked (Here, it refers to the microscope and the telescope that do not have the autofocus function, since the principle of the autofocus function of an optical system having the autofocus function is different from that of the present disclosure, as described in Background).

Figure 5:
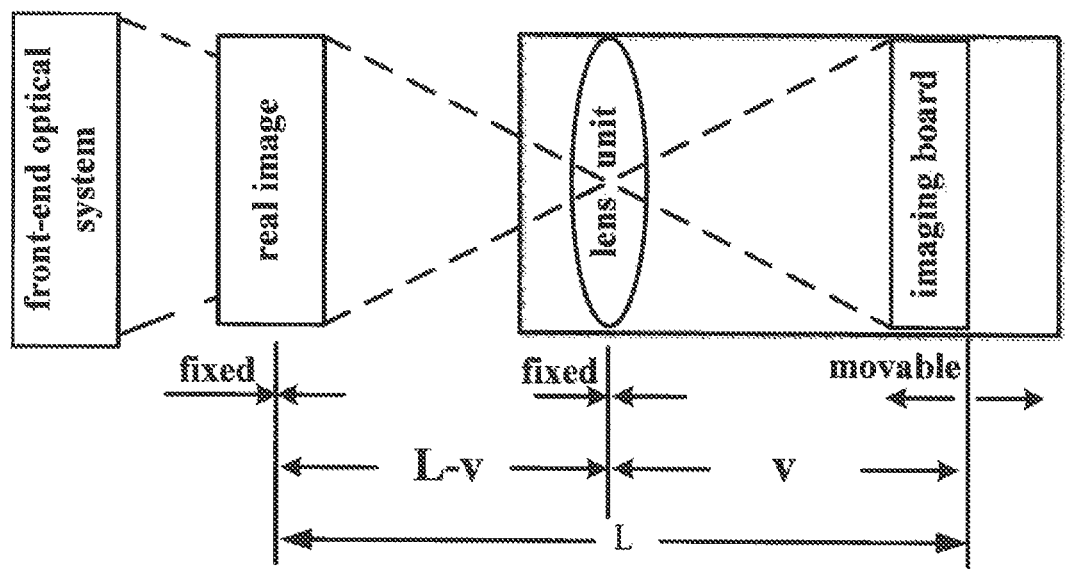
FIG. 5 is a schematic diagram illustrating an optical autofocus principle with a fixed working distance according to an embodiment of the present disclosure.

According to the principle diagrams illustrated in FIG. 1 and FIG. 2, whether for the microscope or the electronic microscope, since its imaging position is fixed, i.e., an image distance v is fixed, and a focal length f is fixed, it can be seen from a Formula 1 below that an object distance u is also fixed. Whether for a manual focusing manner or an automatic focusing manner, the object distance u can only be "found" by moving a front-end optical system or a measured target, to achieve focusing. However, the embodiment is different from the electronic microscope and the electronic telescope in the related art in that, movement of the sensor board is controlled by a master control unit in the automatic focusing device under the condition that the working distance is invariable, so as to "find" a proper image distance v to achieve automatic focusing, please refer to FIG. 5. An optical imaging formula in the related art is shown in Formula 1:

$$\frac{1}{f} = \frac{1}{u} + \frac{1}{v}$$ Formula 1 where u (object distance) is distance (constant) from a front end of the electronic microscope and the electronic telescope to a lens group, and v is the image distance. According to Formula 1, since u is a constant, the image distance v is unique. The automatic focusing device disclosed in the embodiment is to achieve the automatic focusing of the measured target by moving the sensor board inside the automatic focusing device to find the proper image distance v. In the present disclosure, the master control unit of the automatic focusing device analyzes image data, performs a focusing search algorithm, controls a sensor motor by running the focusing search algorithm, to drive movement of the sensor board, and continuously performs the focusing search algorithm during the movement of the sensor board, so as to obtain the position of the sensor board in best focus.

Figure 7:
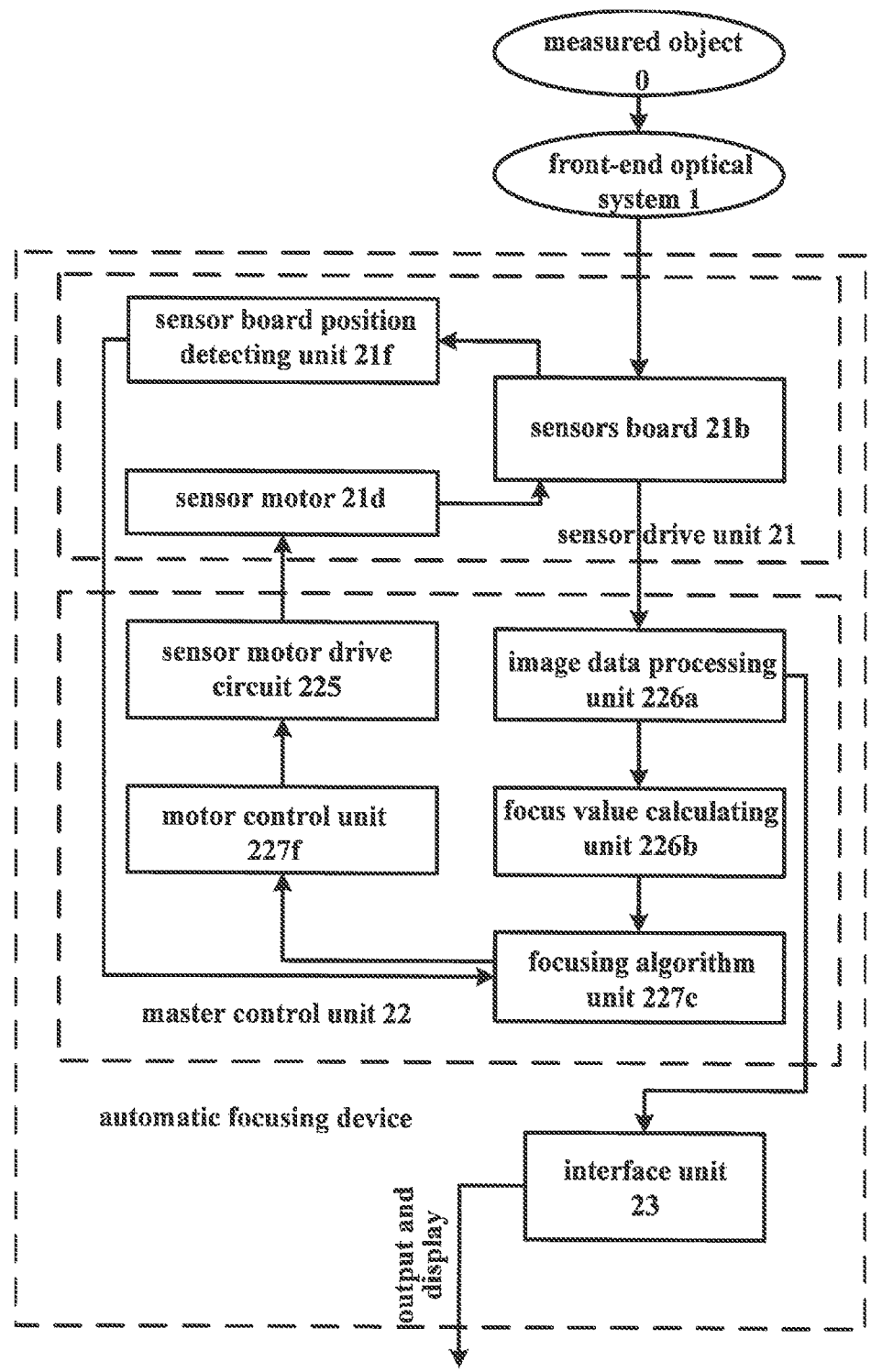
FIG. 7 is a schematic diagram of an automatic focusing device according to an embodiment of the present disclosure.

FIG. 7 is a schematic diagram of a logical structure of an automatic focusing device according to an embodiment. The automatic focusing device includes a sensor drive unit 21, a master control unit 22 and an interface unit 23.

The sensor drive unit 21 includes a sensor board 21b, a sensor motor 21d and a sensor board position detecting unit 21f. The sensor board 21b is configured to convert an optical signal obtained by the front-end optical system into an image signal, and input the obtained image signal to the master control unit 22. The sensor motor 21d receives a sensor motor control signal sent by the master control unit 22, and drives movement of the sensor board 21b according to the obtained control signal, such that the sensor board 21b moves to a position corresponding to an optimal focus value.

The sensor board position detecting unit 21f is configured to detect the position of the sensor board 21b and feedback the position of the sensor board 21b to the master control unit 22.

The master control unit 22 includes an image data processing unit 226a, a focus value calculating unit 226b, a focusing algorithm unit 227c, a motor control unit 227f and a sensor motor drive circuit 225. The sensor board 21b sends the obtained image signal to the master control unit 22, and the master control unit 22 inputs the processed image data and the sensor motor control signal to the interface unit 23 and the sensor drive unit 21, respectively.

The interface unit 23 receives the image data outputted by the master control unit 22, and connects with a display device for image output.

The master control unit 22 includes the image data processing unit 226a, the focus value calculating unit 226b, the focusing algorithm unit 227c, the motor control unit 227f and the sensor motor drive circuit 225.

The image data processing unit 226a is configured to receive the image signal sent by the sensor board 21b, collect and process the obtained image signal, and input the processed image data to the focus value calculating unit 226b.

The focus value calculating unit 226b processes the image data processed by the image data processing unit 226a, calculates a focus value corresponding to the image data, and inputs the obtained focus value to the focusing algorithm unit 227c.

The focusing algorithm unit 227c receives a position signal of the sensor board 21b fed back by the sensor board position detecting unit 21f and the focus value outputted by the focus value calculating unit 226b, and obtains the optimal focus value by performing the focusing search algorithm. A motor control signal generated by the focusing algorithm unit 227c is sent to the motor control unit 227f.

The motor control unit 227f converts the motor control signal obtained from the focusing algorithm unit 227c into a drive signal, and sends the converted drive signal to the sensor motor drive circuit 225.

The sensor motor drive circuit 225 converts the obtained drive signal into a sensor motor control signal and sends the sensor motor control signal to the sensor board 21b.

In the master control unit 22, the image data processing unit 226a receives the image signal sent by the sensor board 21, processes the image signal by dividing the image signal into a plurality of sub-regions, and sends the obtained image data of the plurality of sub-regions to the focus value calculating unit 226b. The focus value calculating unit 226b processes the input image data of each sub-region, obtains a high-frequency component focus value and a low-frequency component focus value corresponding to each sub-region, and sends the obtained focus value to the focusing algorithm unit 227c.

The focusing algorithm unit 227c includes a coarse focusing algorithm subunit and a fine focusing algorithm subunit.

The coarse focusing algorithm subunit is configured to receive the position signal of the sensor board 21b fed back by the sensor board position detecting unit 21f and the focus value outputted by the focus value calculating unit 226b, perform a coarse focusing search algorithm to find a range of an area where the optimal focus value is located, and send the obtained control signal to the sensor motor 21d to enable the sensor motor 21d to drive the sensor board 21b to move to the area where the optimal focus value is located, and then output a signal to the fine focusing algorithm subunit to inform the fine focusing algorithm subunit to perform further fine focusing search, in which the coarse focusing search algorithm adopts an adaptive step size which is greater than a step size adopted by a fine focusing search algorithm.

The fine focusing algorithm subunit is configured to receive the position signal of the sensor board 21b fed back by the sensor board position detecting unit 21f and the focus value outputted by the focus value calculating unit 226b, and perform a fine focusing search algorithm after the signal of the coarse focusing algorithm subunit is received. The fine focusing search algorithm adopts a fixed step size, and finds the position of the optimal focus value by using the fine focusing search algorithm in the area where the optimal focus value is located obtained by the coarse focusing search algorithm, and sends the control signal to the sensor motor 21d, to enable the sensor motor 21d to drive the sensor board 21b to move to the position corresponding to the optimal focus value.

The focusing algorithm unit 227c further includes a focus value selecting unit.

The focus value selecting unit is configured to receive the high-frequency component focus value and the low-frequency component focus value corresponding to each sub-region of the image data outputted by the focus value calculating unit 226b, perform a preset focus value selecting algorithm to analyze the high-frequency component focus value and the low-frequency component focus value corresponding to each sub-region, and determine whether the high-frequency component focus value or the low-frequency component focus value is selected by current focusing search algorithm as the focus value of the search algorithm to perform focusing search, and determine the optimal focus value.

Based on above, the focusing algorithm unit 227c sends the motor drive signal to the motor control unit 227f according to the focus value obtained from the selected search algorithm and the position signal of the sensor board 21b fed back by the sensor board position detecting unit 21f. After the motor control unit 227f receives the drive signal, the motor control unit 227f sends the drive signal to the sensor motor drive circuit 225. After the sensor motor drive circuit 225 receives the drive signal, the sensor motor drive circuit 225 sends the control signal to the sensor motor 21d. The sensor motor 21d controls the sensor board 21b according to the received control signal, to enable the sensor board 21b to move to a new detection position according to the step size set by the selected search algorithm. Through multiple times of to-and-fro movement of the sensor board 21b, the sensor board position detecting unit 21f finds the position of the sensor board 21b corresponding to the optimal focus value. When the focusing algorithm unit 227c determines that the optimal focus value is found, through signal transmission, the sensor motor 21d drives the sensor board 21b to move to the position corresponding to the optimal focus value, to complete focusing. Throughout the focusing process, the sensor motor 21d drives the movement of the sensor board 21b to find the position corresponding to the optimal focus value, to achieve automatic focusing.

The automatic focusing device provided based on this embodiments adopts the main idea in that, the master control unit 22 inside the automatic focusing device controls the sensor drive unit 21 to change the image distance, to enable the automatic focusing device to automatically focus. In detail, the master control unit 22 in the automatic focusing device performs the focusing search algorithm, and obtains the optimal focus value through the focusing search algorithm. The master control unit 22 sends the drive signal to the sensor drive unit 21 inside the automatic focusing device, the sensor motor 21d in the sensor drive unit 21 receives the drive signal sent by the master control unit 22, and control the movement of the sensor board 21b in the sensor drive unit 21, to move the sensor board 21b to the position corresponding to the optimal focus value.

Embodiment Two

In the microscope and the telescope in the related art, since the working distance is fixed, and when a height of a measured object is changed, the image will be unclear.

Figure 3:
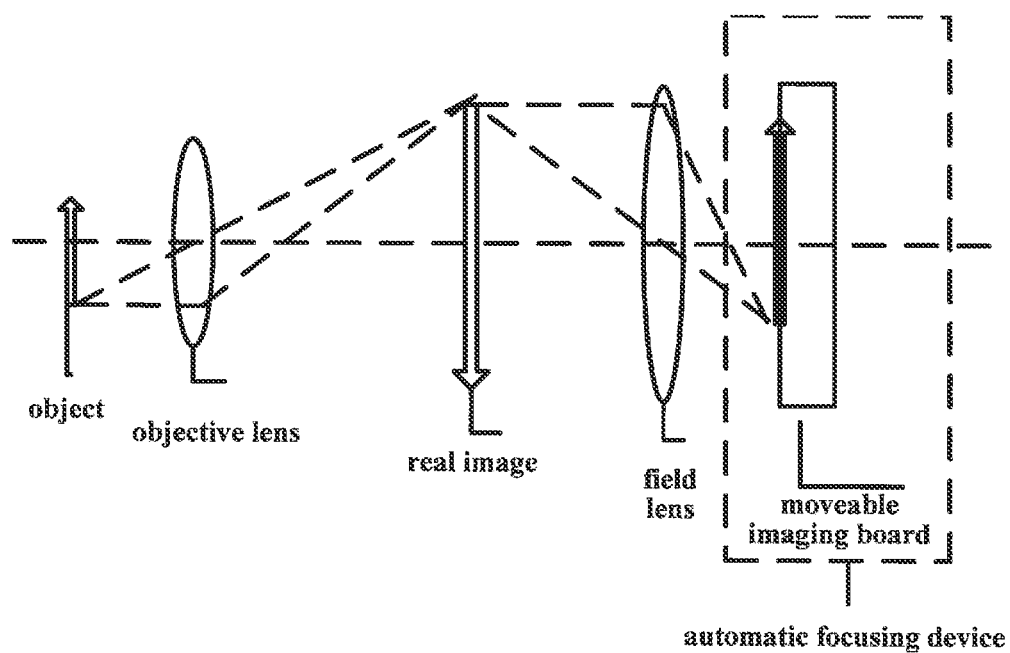
FIG. 3 is a schematic diagram illustrating a working principle of an automatic focusing device of the present disclosure.
Figure 4:
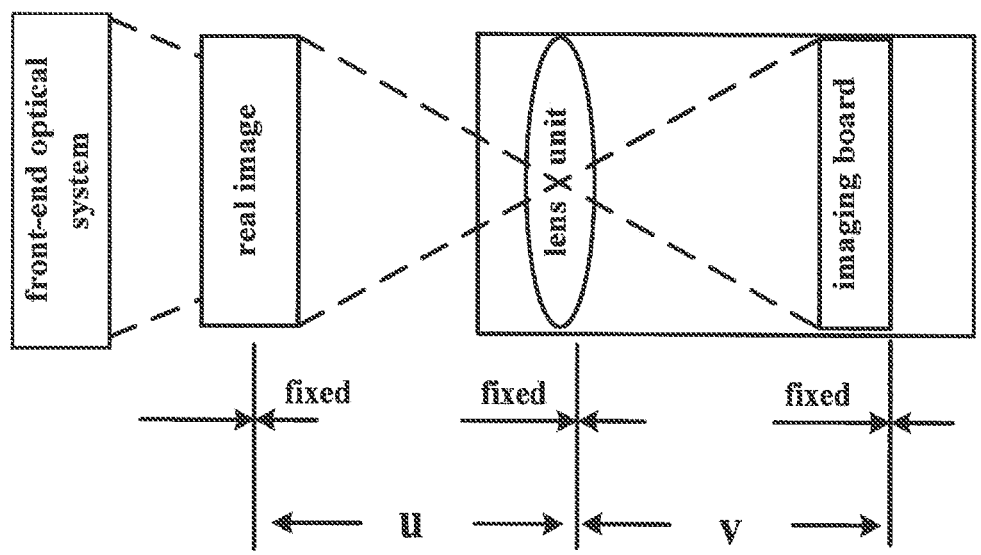
FIG. 4 is a schematic diagram illustrating an autofocus principle of a microscope and a telescope in the related art.
Figure 6:
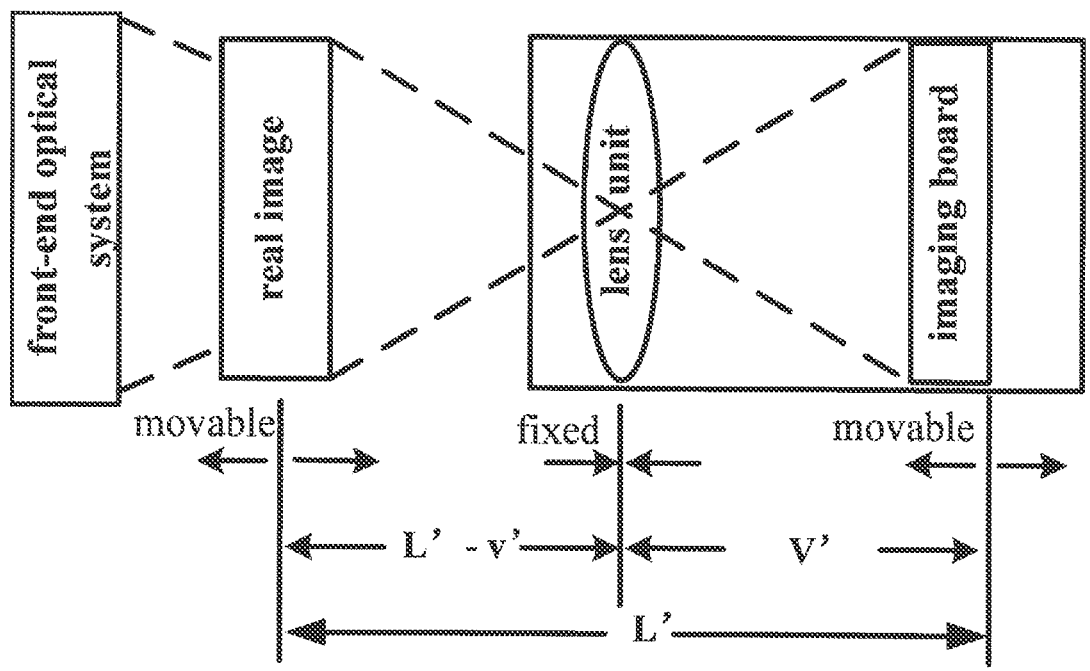
FIG. 6 is a schematic diagram illustrating an optical autofocus principle with a variable working distance according to an embodiment of the present disclosure.

As illustrated in FIG. 3 and FIG. 6, the embodiment is different from the electronic microscope and the electronic telescopes in the related art in that the object distance u is variable. It can be seen from the optical imaging formula 1 that f is fixed, the image distance v is variable (from v to v'), and thus the object distance u is variable (from u to u'). This means that even if the height of the measured object is changed, it can also be able to perform the focusing search algorithm by the master control unit inside the automatic focusing device to automatically control the movement of the sensor board, to correspondingly change the image distance (from v to v') to make the image clear.

Implementation steps of automatic focusing are the same as those in the embodiment one, which will not be elaborated here.

Embodiment Three

Figure 8:
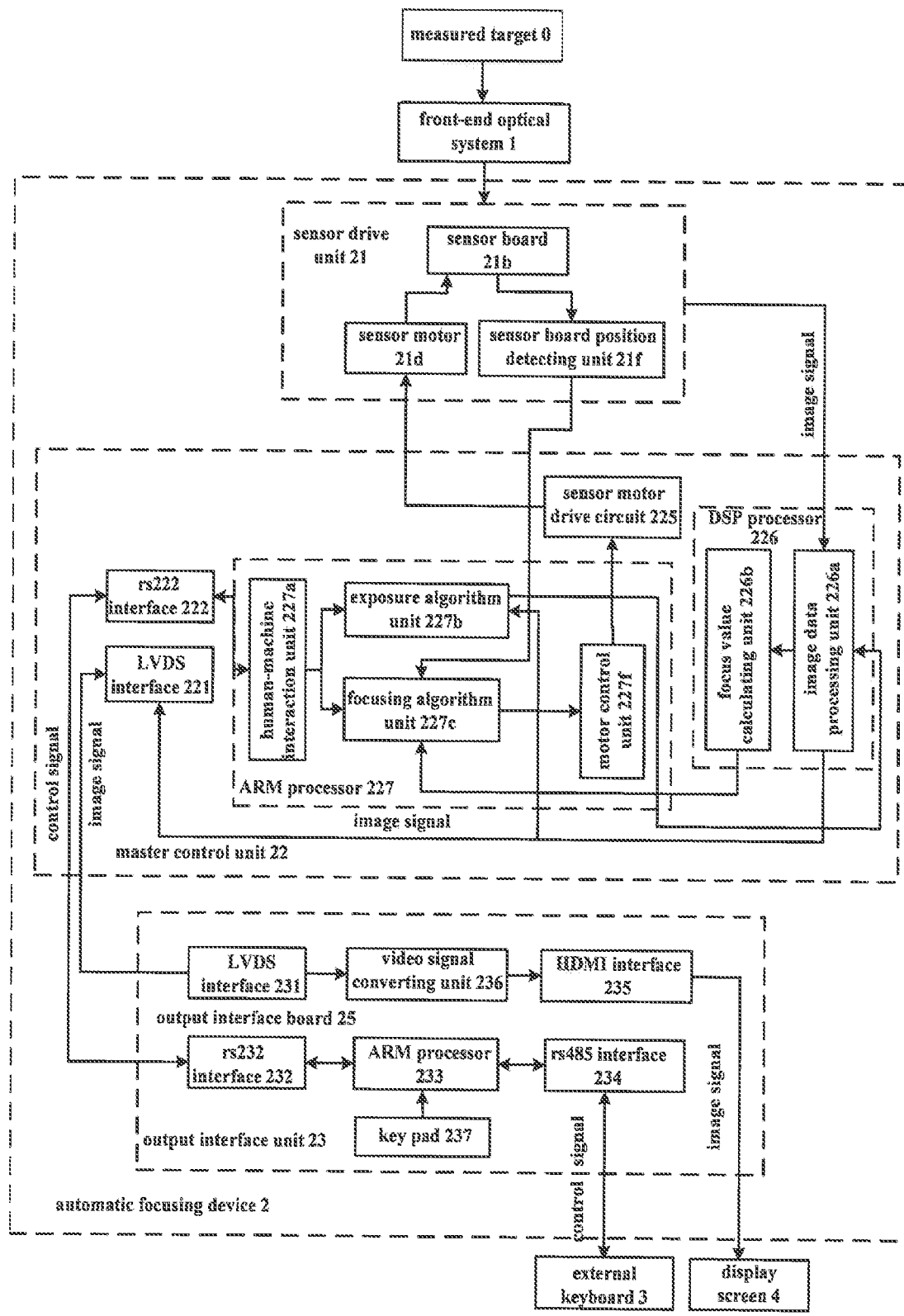
FIG. 8 is a schematic diagram of an optical system having an automatic focusing device according to an embodiment of the present disclosure.

FIG. 8 is a schematic diagram of an optical system having an automatic focusing device. The optical system may be an automatic focusing microscope system, an automatic focusing telescope system, or an automatic focusing industrial camera, which includes an automatic focusing device, a front-end optical system and an external device. The automatic focusing device of this embodiment integrates autofocus function modules of embodiment one and embodiment two, and implementation of specific hardware entities of function modules is described correspondingly. For example, in embodiment three, the image data processing unit 226a and the focus value calculating unit 226b are integrated in a digital signal processor DSP. In other embodiments, it can also be implemented by hardware such as a large-scale programmable logic device or a central processing unit CPU. The present disclosure does not define specific hardware implementation, and any hardware implementation capable of implementing corresponding functions disclosed in the present disclosure should be included in the protection scope of the present disclosure.

The optical system having the automatic focusing device provided in embodiment three includes a front-end optical system 1, an automatic focusing device 2, an auxiliary control unit 3 and a display unit 4. The automatic focusing device 2 includes three parts of a sensor drive unit 21, a master control unit 22 and an output interface unit 23.

The sensor drive unit 21 includes a sensor board 21b, a sensor motor 21d and a sensor board position detecting unit 21f.

The master control unit 22 includes an image data processing unit 226a, a focus value calculating unit 226b, a focusing algorithm unit 227c, a motor control unit 227f, a sensor motor drive circuit 225 and a human-machine interaction unit 227a.

The interface unit 23 includes a video signal converting unit 236, a HDMI interface 235, an ARM (Advanced RISC Machines) processor 233 and an rs485 interface 234.

The video signal converting unit 236 converts a video signal obtained from a LVDS (Low Voltage Differential Signal) interface 231 into a standard video output signal, such as a HDMI video output signal. The HDMI interface 235 is configured to output the video output signal to an external display device.

The ARM processor 233 is configured to receive and recognize a control signal sent by a key pad 237 in the output interface unit 23, and the control signal may include a zoom control signal and a light source adjustment signal. The rs485 interface 234 is configured to receive the control signal sent by the ARM processor 233 and an external keyboard 3, and send the control signal to the ARM processor 233 and the external keyboard 3.

The sensor board 21b in the automatic focusing device mainly includes an image sensor, which can convert an obtained optical signal into an image signal, and transmit the image signal to the mater control unit 22. The sensor board 21b can be moved freely under drive of the sensor motor 21d. The sensor board position detecting unit 21f is configured to detect position information of the sensor board 21b. The sensor drive unit 21 in the automatic focusing device moves the sensor board 21b under control of the master control unit 22 to achieve the autofocus function, and the principle for implementing the automatic focusing is the same as that of the embodiment one, which will not be described herein.

In addition, in order to achieve brightness adjustment of an automatic focusing optical system (the system includes, but is not limited to, a microscope, a telescope, an industrial camera, etc.) based on the above-described automatic focusing device, the master control unit 22 also includes an exposure algorithm unit 227b. The exposure algorithm unit 227b automatically adjusts brightness of the image based on image analysis technology, such that effect of the image is always kept optimal.

The exposure algorithm unit 227b calculates brightness information of the image according to the image data outputted by the image data processing unit 226a. The calculated brightness information of the image is compared with preset image brightness information to calculate brightness adjustment information, a brightness control signal is sent through a corresponding control circuit to control the brightness of the image, such that the image always keeps proper brightness. When the user does not need to control brightness of the image in real time, the user can also set to adjust the brightness manually.

In the mode of manually adjusting the brightness, the difference lies in that, it needs to send a control signal to the human-machine interaction unit 227a after a brightness adjustment signal is received through the output interface unit 23. The man-machine interaction unit 227a calls the exposure algorithm unit 227b to calculate the brightness adjustment information, and sends the brightness control signal through the corresponding auxiliary control unit 3 to control the brightness of the image. The auxiliary control unit 3 may be implemented with an external keyboard, and the image signal outputted by the output interface unit 23 may be received and displayed through a display screen, a PC display, or other display systems.

When automatic brightness adjustment is selected, the program will automatically complete the brightness adjustment, which may be achieved through following steps.

At step F1, preparation is made before the automatic focusing optical system starts.

At step F2, control mode of brightness is set to automatic.

At step F3, an image brightness value Y0 and an allowable error d are preset.

At step F4, a current image brightness value Y is read and recorded from the image data processing unit 226a.

At step F5, the exposure algorithm unit 227b compares the read brightness value Y with the preset image brightness value Y0.

At step F6, when abs(Y−Y0)>d, step F7 is entered, otherwise step F8 is entered.

At step F7, when the read brightness value Y is greater than a threshold (Y0+d), brightness of the light source is decreased, such that the brightness value of the image is within a target brightness range [Y0−d, Y0+d]. When the read brightness value Y is less than a threshold (Y0−d), brightness of light source is increased, such that the brightness value of the image is within the target brightness range [Y0−d, Y0+d].

At step F8, brightness adjustment is completed.

When the manual brightness adjustment is selected, it may be achieved through following steps.

At step G1, preparation is made before the automatic focusing optical system starts.

At step G2, control mode of brightness is set to manual.

At step G3, a brightness adjustment command (increasing brightness or decreasing brightness) is sent to the ARM processor 233 through the key pad 237 or the external keyboard 3 of the output interface board 25.

At step G4, the ARM processor 233 translates key-press information into instructions that can be recognized by the automatic focusing electronic eyepiece, and transmits the instructions to the human-machine interaction unit 227a through a serial port.

At step G5, the human-machine interaction unit 227a calls a manual exposure algorithm (i.e., increasing brightness or decreasing brightness) in the exposure algorithm unit 227b.

At step G6, a brightness adjustment unit adjusts brightness of the image according to the brightness adjustment information.

In the above, the master control unit 22 is the core component of the automatic focusing device, and it is mainly used to implement focus control of the sensor drive unit 21, output the image to a display terminal through the output interface unit 23, implement the human-machine interaction function through the human-machine interaction unit 227a, and implement automatic or manual brightness adjustment of the image through the exposure algorithm unit 227b during automatic focusing, etc.

The output interface unit 23 is mainly used to connect the image signal to the display unit 4 (in this embodiment, a display screen 4) (in embodiment three, through the LVDS interface 231, the video signal converting unit 236 and the HDMI interface 235), and connect the master control unit 22 to the auxiliary control unit 3 (in the embodiment, the external keyboard) through a serial port (in this embodiment, through the rs485 interface 234, the ARM processor 233 and the rs232 interface 232) and the control signal, so as to realize human-machine interaction.

Although in embodiment three of the present disclosure, the rs232 interface 222 and the rs232 interface 232 are used to implement internal signal transmission between the human-machine interaction unit 227a and the output interface unit 23, and the LVDS interface 221 and the LVDS interface 231 are used to implement internal video signal transmission between the image data processing unit 226a and the output interface unit 23. However, the present disclosure does not define the specific interface type and the transmission mode between internal modules. Corresponding internal interface functions can also be incorporated into corresponding modules to implement.

In embodiment three, the image data processing unit 226a and the focus value calculating unit 226b in the master control unit 22 can be implemented by the DSP processor 226, and can also be implemented by other programmers. The human-machine interaction unit 227a, the exposure algorithm unit 227b, the focusing algorithm unit 227c and the motor control unit 227f in the master control unit 22 can be implemented by the ARM processor 227, and can also be implemented by other microelectronic processors.

In another specific embodiment of the present disclosure, the master control unit 22 is set outside the main body of the automatic focusing device, i.e., the master control unit 22 and the sensor drive unit 21 are arranged in different hardware entities. The image signal of the sensor board 21b is directly output to the external device including the master control unit (hereinafter referred to as an external master control device) through a hardware interface. The external master control device performs the focusing search algorithm on the image signal, outputs the motor control signal to the motor drive circuit of the automatic focusing device through the interface unit, and drives the sensor motor through the motor drive circuit, so as to change the position of the sensor board. The sensor board position detecting unit in the automatic focusing device feeds back the position of the sensor board to the master control unit in the external master control device through the interface unit.

In another embodiment of the present disclosure, the master control unit 22 and the sensor drive unit 21 are arranged in the same hardware entity; for example, arranged in an electronic eyepiece. It is not necessary to change the structure of the electronic microscope or the electronic telescope in the related art, but replace the eyepiece with the automatic focusing device of the present disclosure, and then the automatic focusing of the electronic microscope or the electronic telescope can be achieved.

Figure 9:
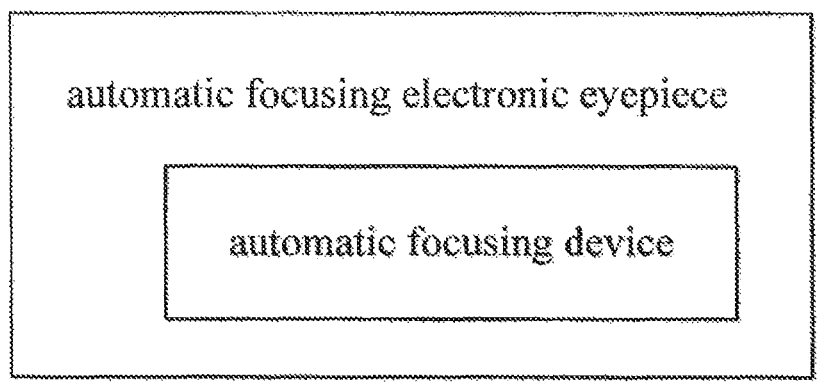
FIG. 9 is a block diagram of an automatic focusing electronic eyepiece.

The present disclosure further provides an automatic focusing electronic eyepiece. As illustrated in FIG. 9, the automatic focusing electronic eyepiece includes the automatic focusing device described above.

Figure 10:
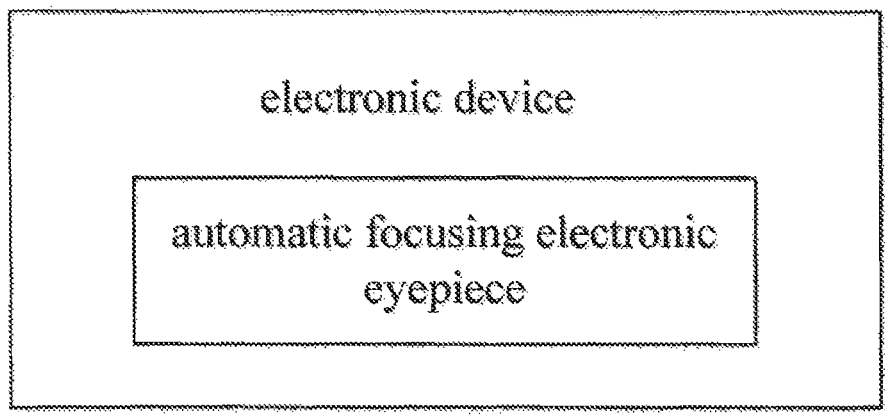
FIG. 10 is a block diagram of an electronic device.

The present disclosure further provides an electronic device. As illustrated in FIG. 10, the electronic device includes the automatic focusing electronic eyepiece described above.

The electronic device may be an automatic focusing electronic microscope, an automatic focusing electronic telescope, or an automatic focusing industrial camera.

As described above, the present disclosure combines the electronic microscope and electronic telescope in the related art with the automatic focusing technology in an innovative way, such that automatic (automatic focusing), intelligent (without understanding operations of the microscope and the telescope, automatic and clear), economic (without changing the structure of electronic microscope and the electronic telescope, just replacing the eyepiece with the automatic focusing device of the present disclosure) and easy operation (without manual focusing) can be achieved. Low efficiency and low precision brought by manual focusing in the related art are eliminated, a quick, accurate and practical focusing mode is provided, such that focusing accuracy and speed are greatly improved.

What is claimed is:

1. An automatic focusing device, comprising:
a sensor drive unit, one or more processors configured to execute one or more software units, and an interface; the one or more software units comprising a master control unit,
wherein when a measured target remains at a relatively fixed position with respect to a front-end optical system,
the master control unit is configured to control the sensor drive unit to enable the automatic focusing device to automatically focus by adjusting an image distance;
the sensor drive unit comprises a sensor board, and a sensor drive motor;
the sensor board is configured to convert an optical signal into an image signal, and output the image signal to the master control unit;
the sensor drive motor is configured to drive movement of the sensor board under control of the master control unit;
the master control unit is configured to process the image signal transmitted by the sensor drive unit, control the sensor drive motor to drive the movement of the sensor board by running a focusing search algorithm to enable the automatic focusing device to automatically focus by adjusting the image distance, when the measured target remains at the relatively fixed position with respect to the front-end optical system;
the interface is configured to output image data of the measured target for display.

2. The automatic focusing device according to claim 1,
wherein the one or more software units comprise a sensor board position detecting unit;
the sensor board position detecting unit is configured to detect a position of the sensor board relative to an origin, and feedback the position of the sensor board to the master control unit; and
the interface is configured to output the image data of the measured target and transmit a human-machine interaction signal.

3. The automatic focusing device according to claim 2, wherein the master control unit comprises: an image data processing unit, a focus value calculating unit, a focusing algorithm unit, a motor control unit, and a sensor motor drive circuit; wherein,
the image data processing unit is configured to receive the image signal sent by the sensor board, collect and process the image signal, and output the processed image data to the focus value calculating unit;
the focus value calculating unit is configured to process the image data received, calculate a focus value corresponding to the image data, and input the focus value calculated to the focusing algorithm unit;
the focusing algorithm unit is configured to receive a position signal of the sensor board relative to the origin fed back by the sensor board position detecting unit and the focus value outputted by the focus value calculating unit, and perform the focusing search algorithm to obtain an optimal focus value and to generate a motor control signal to the motor control unit, such that the sensor board moves to a position corresponding to the optimal focus value under control of the focusing search algorithm;
the motor control unit is configured to convert the motor control signal outputted by the focusing algorithm unit into a drive signal, and output the drive signal to the sensor motor drive circuit; and the sensor motor drive circuit is configured to drive the sensor drive motor according to the drive signal of the motor control unit to move the sensor board to the position corresponding to the optimal focus value.

4. The automatic focusing device according to claim 3, wherein the master control unit comprises a human-machine interaction unit, configured to receive or send information to the interface to achieve human-machine interaction.

5. The automatic focusing device according to claim 3, wherein the focusing algorithm unit comprises: a coarse focusing algorithm subunit and a fine focusing algorithm subunit; wherein, the coarse focusing algorithm subunit adopts an adaptive step size, and is configured to receive the position signal of the sensor board fed back by the sensor board position detecting unit and the focus value outputted by the focus value calculating unit, perform a coarse focusing search algorithm, so as to output a signal to the fine focusing algorithm subunit after controlling the motor control unit to drive the sensor board to move to an area where the optical focus value is located; and the fine focusing algorithm subunit adopts a fixed step size, and is configured to receive the position signal of the sensor board fed back by the sensor board position detecting unit and the focus value outputted by the focus value calculating unit, and perform a fine focusing search algorithm after receiving the signal of the coarse focusing algorithm subunit, so as to control the motor control unit to drive the sensor board to move to the position corresponding to the optimal focus value.

6. The automatic focusing device according to claim 5, wherein, the image data processing unit is configured to input image data of a plurality of sub-regions to the focus value calculating unit;

the focus value calculating unit is configured to process the image data of each sub-region respectively, so as to obtain a high-frequency component focus value and a low-frequency component focus value corresponding to each sub-region;

the focusing algorithm unit further comprises: a focus value selecting unit;

wherein the focus value selecting unit is configured to receive the high-frequency component focus value and the low-frequency component focus value corresponding to each sub-region of the image data outputted by the focus value calculating unit, and determine the focus value outputted to the coarse focusing algorithm subunit and the focus value outputted to the fine focusing algorithm subunit based on a preset focus value selecting algorithm, such that the optimal focus value is able to be determined.

7. The automatic focusing device according to claim 1, wherein the master control unit is configured to:

keep a working distance of the front-end optical system fixed, and control movement of the sensor board inside the sensor drive unit to search the image distance, thereby enabling the automatic focusing device to automatically focus; or keep the working distance of the front-end optical system variable, and control movement of the sensor board inside the sensor drive unit to change the image distance, thereby enabling the automatic focusing device to automatically focus.

8. The automatic focusing device according to claim 1, wherein the master control unit and the sensor drive unit are integrated in a hardware entity or disposed in different hardware entities.

9. An automatic focusing electronic eyepiece, comprising an automatic focusing device, wherein the automatic focusing device comprises a sensor drive unit, one or more processors configured to execute one or more software units, and an interface; the one or more software units comprising a master control unit, when a measured target remains at a relatively fixed position with respect to a front-end optical system, the master control unit is configured to control the sensor drive unit to enable the automatic focusing device to automatically focus by adjusting an image distance;

wherein the sensor drive unit comprises a sensor board, and a sensor drive motor;

the sensor board is configured to convert an optical signal into an image signal, and output the image signal to the master control unit;

the sensor drive motor is configured to drive movement of the sensor board under control of the master control unit;

the master control unit is configured to process the image signal transmitted by the sensor drive unit, control the sensor drive motor to drive the movement of the sensor board by running a focusing search algorithm to enable the automatic focusing device to automatically focus by adjusting the image distance, when the measured target remains at the relatively fixed position with respect to the front-end optical system; and the interface is configured to output image data of the measured target for display.

10. The automatic focusing electronic eyepiece according to claim 9, wherein the one or more software units comprise a sensor board position detecting unit;

the sensor board position detecting unit is configured to detect a position of the sensor board relative to an origin, and feedback the position of the sensor board to the master control unit; and the interface is configured to output the image data of the measured target and transmit a human-machine interaction signal.

11. The automatic focusing electronic eyepiece according to claim 10, wherein the master control unit comprises: an image data processing unit, a focus value calculating unit, a focusing algorithm unit, a motor control unit, and a sensor motor drive circuit; wherein, the image data processing unit is configured to receive the image signal sent by the sensor board, collect and process the image signal, and output the processed image data to the focus value calculating unit;

the focus value calculating unit is configured to process the image data received, calculate a focus value corresponding to the image data, and input the focus value calculated to the focusing algorithm unit;

the focusing algorithm unit is configured to receive a position signal of the sensor board relative to the origin fed back by the sensor board position detecting unit and the focus value outputted by the focus value calculating unit, and perform the focusing search algorithm to obtain an optimal focus value and to generate a motor control signal to the motor control unit, such that the sensor board moves to a position corresponding to the optimal focus value under control of the focusing search algorithm;

the motor control unit is configured to convert the motor control signal outputted by the focusing algorithm unit into a drive signal, and output the drive signal to the sensor motor drive circuit; and the sensor motor drive circuit is configured to drive the sensor drive motor according to the drive signal of the motor control unit to move the sensor board to the position corresponding to the optimal focus value.

12. The automatic focusing electronic eyepiece according to claim 11, wherein the master control unit comprises a human-machine interaction unit, configured to receive or send information to the interface to achieve human-machine interaction.

13. The automatic focusing electronic eyepiece according to claim 11, wherein the focusing algorithm unit comprises: a coarse focusing algorithm subunit and a fine focusing algorithm subunit; wherein, the coarse focusing algorithm subunit adopts an adaptive step size, and is configured to receive the position signal of the sensor board fed back by the sensor board position detecting unit and the focus value outputted by the focus value calculating unit, perform a coarse focusing search algorithm, so as to output a signal to the fine focusing algorithm subunit after controlling the motor control unit to drive the sensor board to move to an area where the optical focus value is located; and the fine focusing algorithm subunit adopts a fixed step size, and is configured to receive the position signal of the sensor board fed back by the sensor board position detecting unit and the focus value outputted by the focus value calculating unit, and perform a fine focusing search algorithm after receiving the signal of the coarse focusing algorithm subunit, so as to control the motor control unit to drive the sensor board to move to the position corresponding to the optimal focus value.

14. The automatic focusing electronic eyepiece according to claim 13, the image data processing unit is configured to input image data of a plurality of sub-regions to the focus value calculating unit;

the focus value calculating unit is configured to process the image data of each sub-region respectively, so as to obtain a high-frequency component focus value and a low-frequency component focus value corresponding to each sub-region;

the focusing algorithm unit further comprises: a focus value selecting unit;

wherein the focus value selecting unit is configured to receive the high-frequency component focus value and the low-frequency component focus value corresponding to each sub-region of the image data outputted by the focus value calculating unit, and determine the focus value outputted to the coarse focusing algorithm subunit and the focus value outputted to the fine focusing algorithm subunit based on a preset focus value selecting algorithm, such that the optimal focus value is able to be determined.

15. The automatic focusing electronic eyepiece according to claim 9, wherein the master control unit is further configured to:

keep a working distance of the front-end optical system fixed, and control movement of the sensor board inside the sensor drive unit to search the image distance, thereby enabling the automatic focusing device to automatically focus; or keep the working distance of the front-end optical system variable, and control movement of the sensor board inside the sensor drive unit to change the image distance, thereby enabling the automatic focusing device to automatically focus.

16. The automatic focusing electronic eyepiece according to claim 9, wherein the master control unit and the sensor drive unit are integrated in a hardware entity or disposed in different hardware entities.

17. An electronic device, comprising an automatic focusing electronic eyepiece according to claim 9.

18. The electronic device according to claim 16, wherein the electronic device comprises an automatic focusing electronic microscope.

19. The electronic device according to claim 16, wherein the electronic device comprises an automatic focusing electronic telescope.

20. The electronic device according to claim 16, wherein the electronic device comprises an automatic focusing industrial camera.

* * * * *